(12) United States Patent  
Singh (10) Patent No.: US 9,049,488 B2  
(45) Date of Patent: Jun. 2, 2015

(54) SYSTEMS AND METHODS FOR DISPLAYING AND INTERACTING WITH INTERACTION OPPORTUNITIES ASSOCIATED WITH MEDIA CONTENT

(71) Applicant: Jamabi, Inc., Santa Monica, CA (US)

(72) Inventor: Abhimanyu Singh, Santa Monica, CA (US)

(*) Notice: Subject to any disclaimer, the term of this patent is extended or adjusted under 35 U.S.C. 154(b) by 0 days.

(21) Appl. No.: 14/073,715

(22) Filed: Nov. 6, 2013

(65) Prior Publication Data

US 2014/0130103 A1     May 8, 2014

Related U.S. Application Data

(60) Provisional application No. 61/722,947, filed on Nov. 6, 2012.

(51) Int. Cl.

| H04N 7/10 | (2006.01) |
|---|---|
| H04N 21/478 | (2011.01) |
| H04N 21/2343 | (2011.01) |
| H04N 21/4725 | (2011.01) |
| H04N 21/858 | (2011.01) |
| H04N 21/44 | (2011.01) |
| H04N 21/472 | (2011.01) |

(52) U.S. Cl.
CPC . *H04N 21/47815* (2013.01); *H04N 21/234318* (2013.01); *H04N 21/4725* (2013.01); *H04N 21/8583* (2013.01); *H04N 21/44008* (2013.01); *H04N 21/47202* (2013.01); *H04N 21/47217* (2013.01)

(58) Field of Classification Search
CPC ................... H04N 21/2542; H04N 21/47815; H04N 21/4725; H04N 21/8583
USPC ...................................................... 725/51, 60
See application file for complete search history.

(56) References Cited

U.S. PATENT DOCUMENTS

| 5,929,849 | A | * | 7/1999 | Kikinis ......................... 725/113 |
|---|---|---|---|---|
| 7,325,245 | B1 | * | 1/2008 | Clapper ......................... 725/54 |
| 2001/0052133 | A1 | * | 12/2001 | Pack et al. ..................... 725/109 |
| 2006/0259930 | A1 | * | 11/2006 | Rothschild ...................... 725/81 |
| 2008/0066129 | A1 | * | 3/2008 | Katcher et al. ................ 725/109 |
| 2008/0201734 | A1 | * | 8/2008 | Lyon et al. ..................... 725/34 |

* cited by examiner

*Primary Examiner* — Benjamin R Bruckart
*Assistant Examiner* — Carmine Malangone
(74) *Attorney, Agent, or Firm* — Leydig, Voit & Mayer; Gerald T. Gray (57) ABSTRACT

Methods to present video and purchasing function content embedded in the video in a single user interface. The user interface may be configured to allow the user watching the video to take an action with respect to the video content, which may include items for purchase, and to allow the user to both watch the video content, and select the item for purchase in one transaction step. In other embodiments, the video content is segmented such that a user is provided the ability to select one or more objects in the video. In other embodiments, the user interface provides a dynamic message such as a "call to action" to a user. The call to action may be timed with the video and/or with the user viewing selections in order to urge a user to take a pre-determined action such as purchase a product, make a donation, and the like.

7 Claims, 5 Drawing Sheets

FIG. 2: As the media continues to play, a second call to action opportunity is displayed.

FIG. 3: As the media continues to play, a third call to action opportunity is displayed.

Fig 4: As the media continues to play, a fourth call to action opportunity is displayed.... and so on until all call to action opportunities are displayed as their associated media segments keep coming up in the media.

FIG. 5

SYSTEMS AND METHODS FOR DISPLAYING AND INTERACTING WITH INTERACTION OPPORTUNITIES ASSOCIATED WITH MEDIA CONTENT

CROSS-REFERENCE TO RELATED APPLICATIONS

This patent application claims the benefit of U.S. Provisional Patent Application No. 61/722,947, filed Nov. 6, 2012, which is incorporated by reference in its entirety for all purposes.

FIELD OF INVENTION

The invention relates to a media content display methods and apparatus, including display devices, such as a kiosk or computer system, used to present videos to viewers.

SUMMARY

Systems, devices and methods are provided for displaying media content including call-to-action opportunities associated with the media content. Systems, devices and methods are also provided for identification of call-to-action opportunities associated with media content and displayed while the media content plays on a media player or displayed on the media player in conjunction with a thumbnail image representing the media content.

In one embodiment, content posters are able to associate call-to-action opportunities with media content. In certain aspects, a content poster can select from system generated possible call-to-action opportunities. In certain aspects, a content poster can use speech recognition technology to identify call-to-action opportunities.

In one embodiment, call-to-action opportunities are shown or displayed in the media player as the media plays the associated segment of the call-to-action opportunity. Advantageously, a viewer does not have to wait until media playback is over to know what call-to-action opportunities are available through the media player. The viewer can identify such call-to-action opportunities as the media begins playing the associated segment of the call-to-action opportunity through information displayed on the side, top or bottom bar or on any other part of the media player. The viewer can respond to a call-to-action by proceeding directly to complete the call-to-action even before the media playing ends, or by playing the complete media and then proceeding to complete a specific call-to-action or all call-to-actions after the media playing ends.

In one embodiment, call-to-action opportunities are displayed earlier in the media player viewer, e.g., before media content plays. A viewer can identify call-to-action opportunities through the information displayed on a thumbnail image on the media player (when media represented by the thumbnail has not even started to play yet). The viewer does not have to start the media player to know what call-to-action opportunities are available through the media player. The viewer can respond to a call-to-action by proceeding directly to complete the call-to-action without playing any media, by playing only the segmented media related to the specific call-to-action(s) and then proceed to complete the call-to-action(s), or by playing the media content and then proceeding to complete specific call-to-action or all call-to-actions, either before or after the media playing ends.

DETAILED DESCRIPTION

Systems, devices and methods are provided for displaying media content including call-to-action opportunities associated with the media content. Systems, devices and methods are also provided for identification of call-to-action opportunities associated with media content and displayed while the media content plays on a media player or displayed on the media player in conjunction with a thumbnail image representing the media content.

A "call-to-action opportunity" or "call-to-action" is defined in certain aspects as a user-selectable element (e.g., visual display element) that enables an interaction; a data, money or information transfer or exchange; or a financial or non-financial transaction to access goods and/or services such as, but not limited to, sales, donations, tips, sign-ups, registrations, polls, tickets, coupons, surveys, broadcasts, streaming, pay-per view, appointments, comments, ratings, subscriptions, classes, rentals, leases etc. In certain aspects, a call-to-action(s) is initiated on a media player that displays one or multiple media content. The call-to-action(s) is completed on the media player in the same single frame or the same single interface of the media player.

"Media content" as used herein includes, but is not limited to, at least one of a text document, an image, a PDF, audio file, video file, MIDI file, software file, broadcast, program, streaming content or pay-per view content. "Media content" may be discussed herein with reference to a video or video content as a specific example, however, it should be understood that such exemplary media content can be of any of a variety of file types as discussed above.

The media player can be embedded/implemented on an email, web site, web browser, mobile browser, web app, mobile app, tv screen through or without a computing device, computer-aided or computer-supplemented device, such as, but not limited to, a desktop computer, laptop computer, notebook computer, tablet computer, wearable computer, networked device, home network, office network, public network, phone, smart phone, wireless phone, personal digital assistant, kiosk or television.

The systems and methods as described herein can be implemented in conjunction with, in place of, or in addition to the systems and methods disclosed in US Patent Application Publication No. 2010/0094728, titled "Method and System for Distributing Media Content and Processing Payments and/or Voluntary Data Collections", and filed on Sep. 14, 2009 as U.S. application Ser. No. 12/559,314, which is incorporated by reference herein for all purposes.

In one embodiment, a process flow for associating call-to-action opportunities with media content proceeds as follows:
A content poster initiates a process to associate call-to-action opportunities with a media content.
The content poster obtains media content by either:
  Accessing a previously created and stored media content;
  Accessing an internet uploaded, cloud based or broadcasted media content; or
  Creating media content by filming through camera or camera based computing devices such as, but not limited to, smart phones, laptop computers, notebook computers, tablet computers, wearable computers, personal digital assistants etc.

Figure 1:
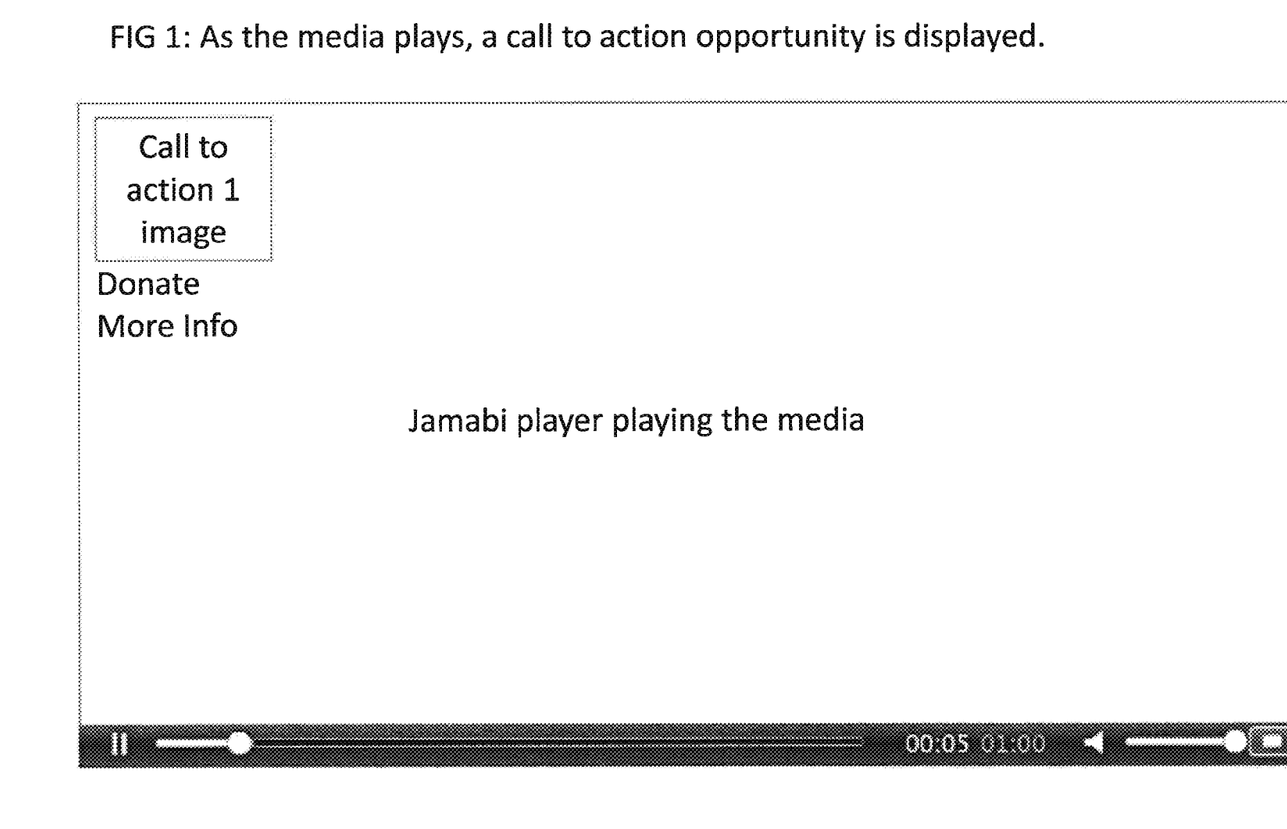
FIGS. 1-4 illustrate displays of call-to-action opportunities according to an embodiment.
Figure 2:
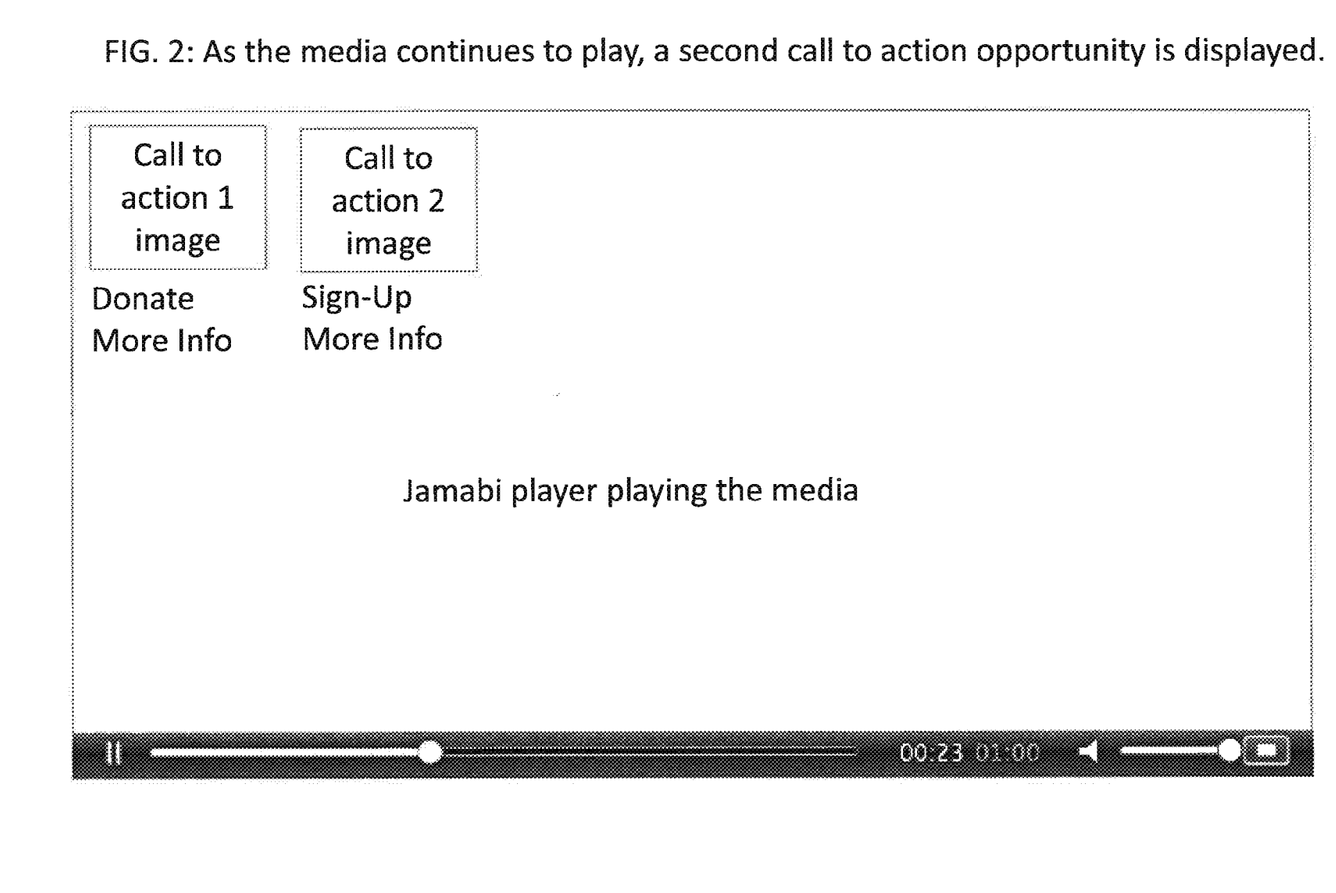
Figure 3:
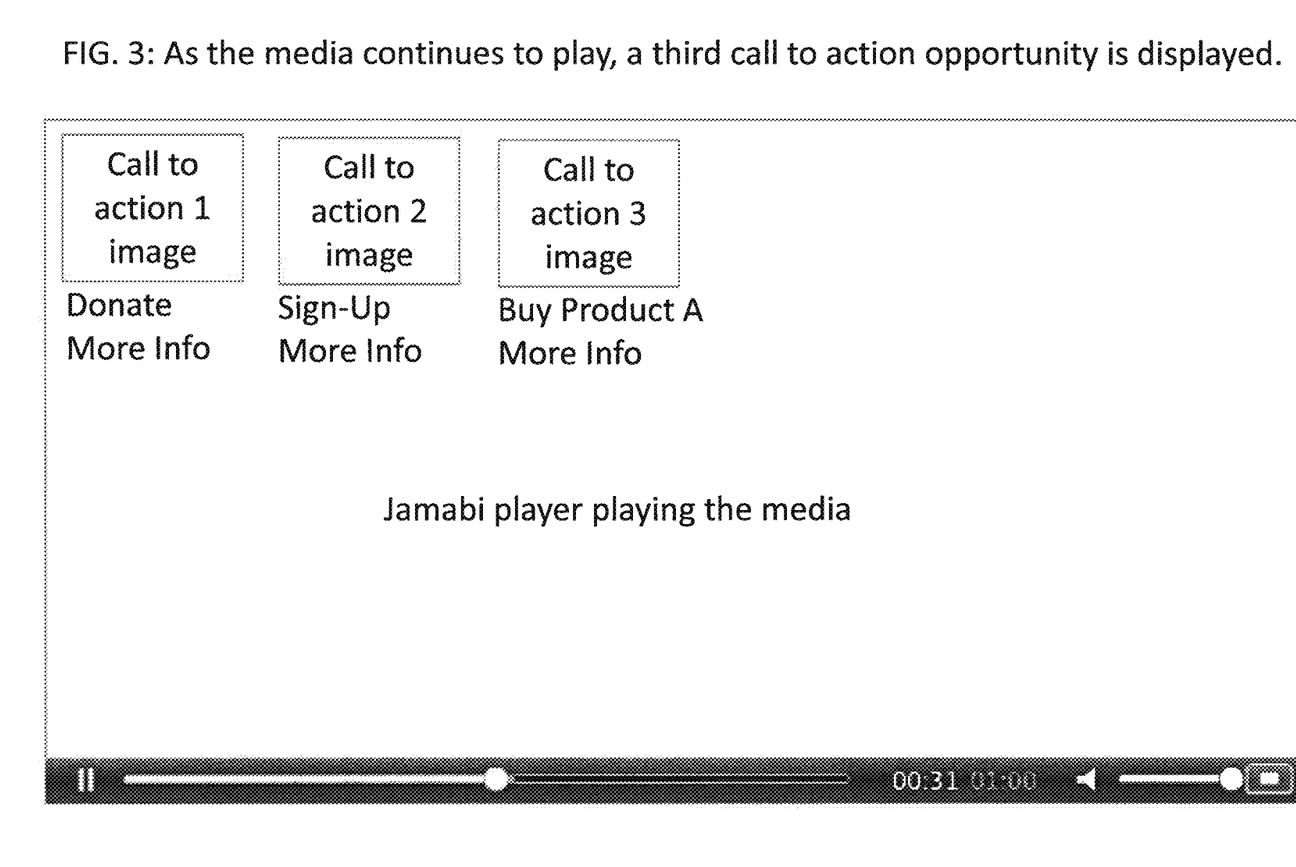
Figure 4:
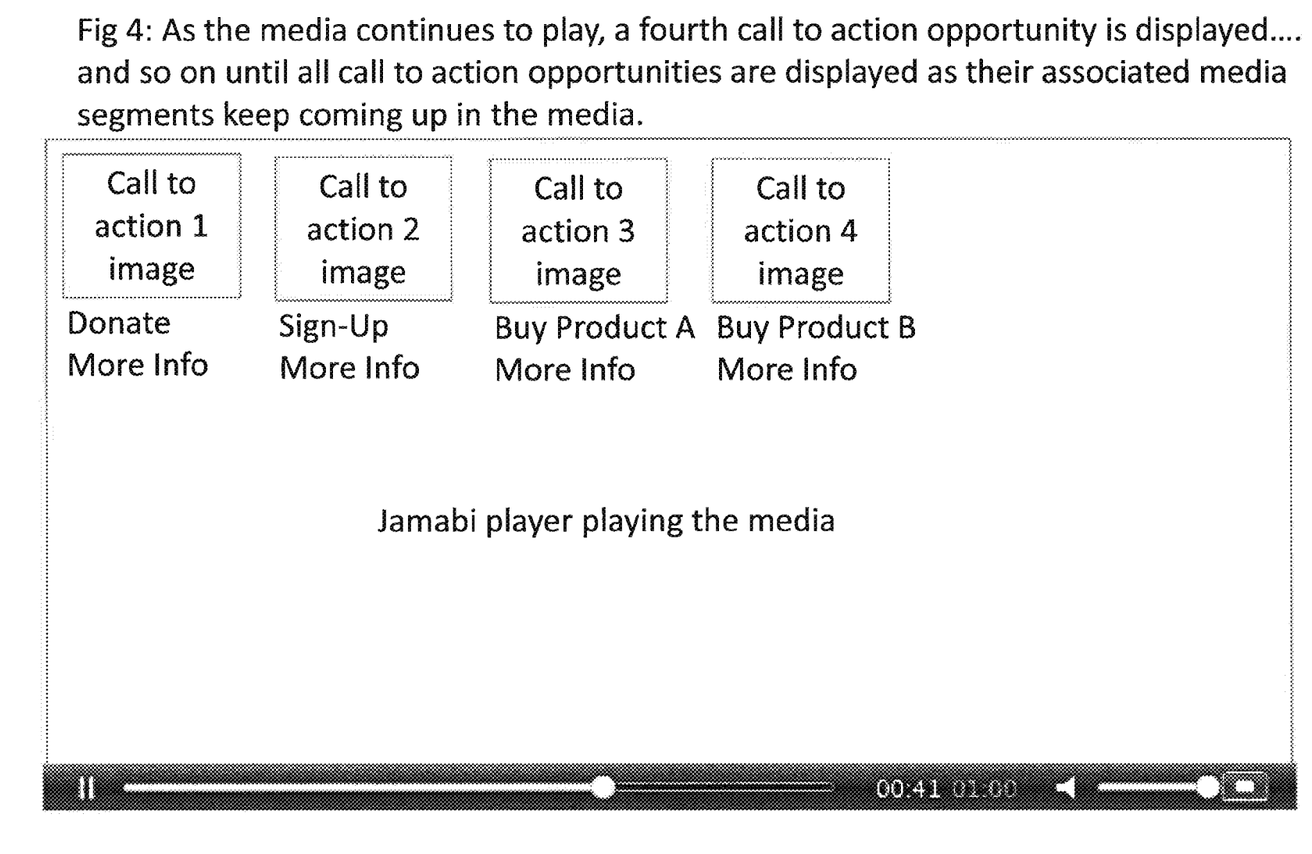
Figure 5:
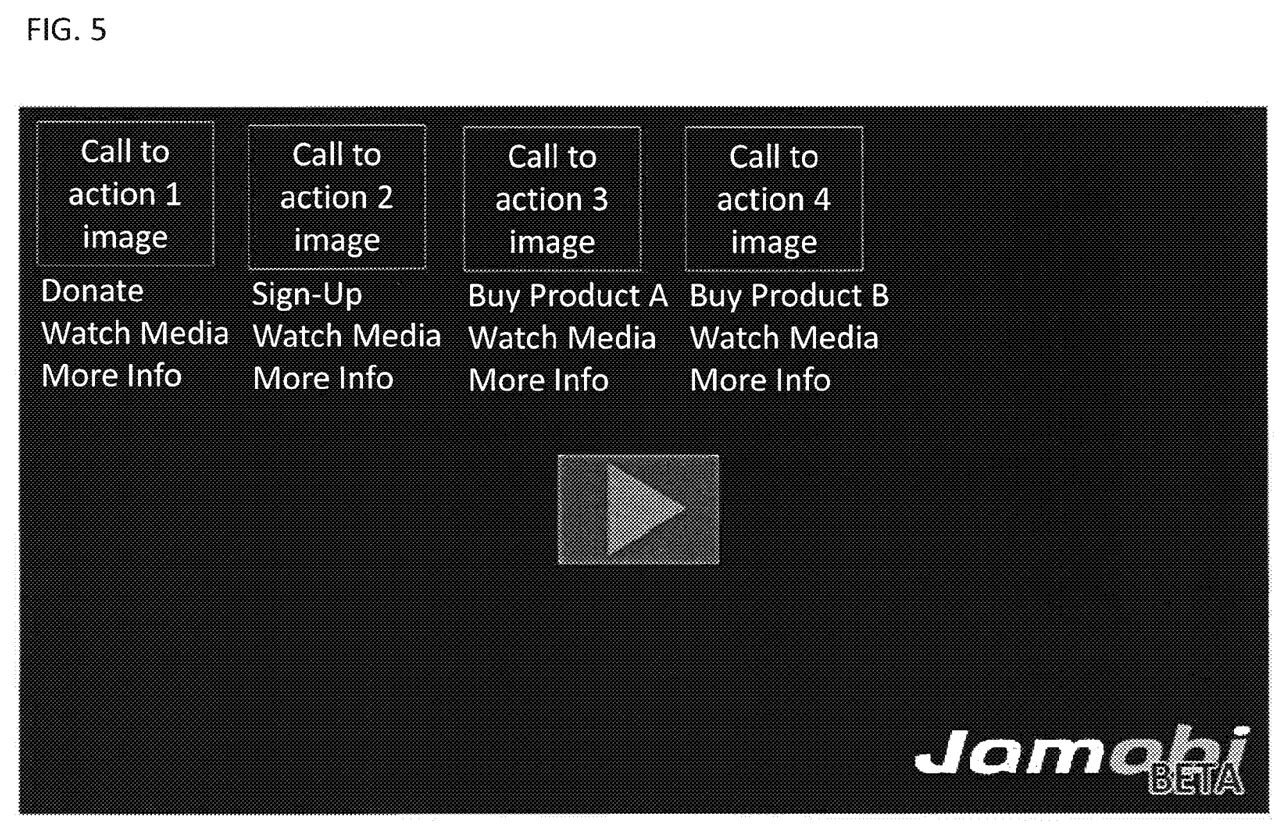
FIG. 5 illustrates an embedded/implemented media player and various call-to-action opportunities displayed as thumbnail images according to an embodiment.

The content poster associates call-to-action opportunities using one or both of the following methodologies:
  System generated possible call-to-action opportunities:
    System scans through the media content and suggests possible call-to-action opportunities.
    Content poster:
      Selects one or more suggested call-to-action opportunities and edits as needed.
      Selects none of the suggested call-to-action opportunities.
      Creates call-to-action opportunities that have not been suggested by the system.
    Content poster then provides further details and information on each of the call-to-action opportunities.
  Speech recognized call-to-action opportunities:
    While the media content is being created (e.g., filmed or recorded) or when being played, the content poster speaks various voice commands to instruct the system about the call-to-action opportunities.
      Responsive to the specific voice command, the system creates the specific call-to-action opportunity.
      Responsive to the timing of the voice command in relation to the creation or playing of the media content, the system scans the media content at that time to gather more information about the call-to-action opportunity. Such information can range from, but not limited to, picture, sound, symbols, logos, contextual information etc.
    Content poster then provides further details and information on each of the call-to-action opportunities either through speech or using a computing device, smart phone, tablet computer etc.
Once the call-to-action opportunities are identified, the content poster gives instruction to associate the call-to-action opportunities with the media content.
The media player integrates the call-to-actions with the media content and generates an embed/implementation code.
The media player, media content and the associated call-to-actions are embedded/implemented to be viewed by viewers.
  In one embodiment, a process flow for identifying and displaying call-to-action opportunities associated with media content proceeds as follows:
A content poster identifies and associates one or more calls-to-action (and associated details) with a media content.
A thumbnail of the media content is selected by the content poster or automatically by the media player.
The media player integrates the call-to-actions with the media content and generates an embed/implementation code.
The media player, media content and the associated call-to-actions are embedded/implemented to be viewed by viewers.
The viewer sees the embedded/implemented media player and also the thumbnail.
As the media starts playing, a call-to-actions start displaying on the media player as the associated media segment of the call-to-action starts.
As media continues to play, other call-to-actions also start displaying on the media player as their associated specific media segments start playing.
By the time media finishes playing, all the call-to-actions are displayed.
FIGS. 1-4 illustrate display of call-to-action according to this embodiment.
  In one embodiment, a viewer can respond to (select) a call-to-action through one of the following ways:
    Start the media content and proceed directly to complete the call-to-action before the media playing ends.
    Start playing the complete media and then proceed to complete specific call-to-action or all call-to-actions after the media playing ends.
  In one embodiment, a process flow for identifying and displaying call-to-action opportunities associated with media content proceeds as follows:
A content poster identifies and associates various calls-to-action (and associated details) with a media content.
A thumbnail of the media content is selected by the content poster or automatically by the media player.
The media player integrates the call-to-actions with the media content and generates an embed/implementation code.
The media player, media content and the associated call-to-actions are embedded/implemented to be viewed by viewers.
The viewer sees the embedded/implemented media player and also the thumbnail. The viewer also sees the various call-to-action opportunities displayed on the thumbnail (see FIG. 5 for illustration).
  In one embodiment, a viewer can respond to (select) a call-to-action through one of the following ways:
    Proceed directly to complete the call-to-action without playing any media content.
    Play only the segmented media content related to the specific call-to-action(s) and then proceed to complete the call-to-action(s).
    Start playing the media content and then proceed to complete specific call-to-action or all call-to-actions, either before or after the media content playing ends.
  In one embodiment, dynamic call-to-action opportunities are displayed in the media player. A dynamic call-to-action opportunity offered to a viewer may change depending on the location of the viewer, where the media is viewed, and/or the date and time when the media is viewed by the viewer. In one embodiment, a process flow for identifying and displaying dynamic call-to-action opportunities associated with media content proceeds as follows:
A content poster identifies and associates one or more dynamic calls-to-action (and associated details) with a media content.
The calls-to-actions can be made location specific as well as time and date specific.
The thumbnail of the media content is selected by the content poster or automatically by the media player. The thumbnail of the media content can be made location as well as time/date specific.
The media player integrates the call-to-actions with the media content and generates an embed/implementation code.
The media player, media content and the associated call-to-actions are embedded/implemented to be viewed by viewers.
Subject to location where the media is viewed and time/date when the media is viewed the viewer sees:
  The dynamic thumbnail.
  The dynamic call to action.
Viewer then responds to the time/date and location specific call-to-action.
On initiation or selection of a call-to-action the viewer is taken within the same frame/interface to complete the call-to-action.
  In various embodiments, on initiation or selection of a call-to-action(s), with or without display of media content, the viewer is taken within the same frame/interface to complete the call-to-action(s). On completion of the call-to-action(s), the media player gives the viewer some or all of the following options:
    Complete other call-to-actions.
    Watch complete or segmented media.
    Share the media/media player.
    Comment on the media or its associated call-to-action(s).

Rate the media or its associated call-to-action(s).
Watch other media posted by same content poster.
Complete similar call-to-actions posted by other content posters.

The above actions may be done all or in part by a processor or processors. A call-to-action may be displayed on a floating window played above the media being played such that the user identifies the media content (e.g., video) and call-to-action being part of and viewed in the same viewing frame. Also, the video may be altered such that a call-to-action may be presented by a character in the video. For example, the BOB MARLEY character could ask for a donation. In addition, the call-to-action may have a heat map type of histogram to show how rapidly the user's are donating to excite the other user's who are not sure to answer the call-to-action.

In one embodiment, the call to action may be considered a dynamic message to the user of the video that changes with response, or no response from the user. For example, the call to action may be used to urge users to make a choice, take an action, make a selection, and the like. In an embodiment, the call to action may be driven by inputs by the user. For example, the inputs may be where the user has selected to watch the video, e.g., from the beginning, the middle, etc. The location and content of the video may be used in generating the message.

In one embodiment, a portion of the video may contain content intended for a particular demographic. In one example, the content of the video may be tailored to a particular recipient demographic such that the call to action may change in response to a user's video portion selection. For example, if the video portion contained images or other content designed for female recipients, age 45-54, the call to action may be modified to accommodate the same demographic.

In another example, the number of times or speed that a video portion is played may also affect the message. For example, if a particular portion of the video was designed to attract 13 year old boys such that such a demographic would want to repeatedly watch such video portion, then the message may be tuned to demographics for 13 year old boys, if the user replays the portion several times.

1. Content Selection within a video.

In one embodiment, the media player is configured to allow a user to select content within a video segment. This allows the user to identify and select the items for purchase. For example, a user may be viewing a video clip containing a new car. The video content is then displayed with the new car. As the user positions a selection tool near the new car in the video, the car is highlighted for user selection, e.g., to associate the car as a call-to-action. In other embodiments, portions of the video objects are selectable to allow the user to purchase or view subsets of the object. For example, in the above car example, the user may mouse over a tire and the tire would then be highlighted in order for the user to know that the tire may be purchased separately.

In an embodiment, the video may be processed as follows:
1. The video is uploaded to a video processing systems.
2. Objects within the video are detected.
3. The detected objects are tagged.
4. The tags are stored in a tangible media for later retrieval.
5. The objects position and temporal data are determined and stored.
6. Meta data about the objects is received.
7. The video is prepared for presentation to the user.
8. The video is presented to the user or optical recognition system for use thereof.

Video Processing:
Image Detection.

Virtually any detection scheme may be employed to detect objects in one or more video frames. Image detection is not limited to methods that analyze the video stream, video data, video codec, color channels, RGB data, pixel data, illumination, tone mapping, gamma, light fields, and/or methods that employ optical recognition such as optical character recognition (OCR), optical scan, optical projection, shape detectors, and the like. Image detection may be also accomplished by analyzing output data from video creation systems that generate objects versus record objects in a real-world scene. The video processing system typically includes familiar computer components such as a processor such as a central processing unit (CPU) a graphics processing unit (GPU), and the like, and memory storage devices, such as a memory, e.g., random access memory (RAM), disk drives, and system bus interconnecting the above components. In one embodiment, computer is a PC compatible computer having multiple microprocessors. While a computer is shown, it will be readily apparent to one of ordinary skill in the art that many other hardware and software configurations are suitable for use with the present invention. Memory and disk drive are examples of tangible media for storage of data, audio/video files, computer programs, and the like. Other types of tangible media include floppy disks, removable hard disks, optical storage media such as CD-ROMS and bar codes, semiconductor memories such as flash memories, read-only-memories (RUMS), battery-backed volatile memories, networked storage devices, and the like.

A wireless device may be used. In one embodiment, similar to computer above, wireless device is capable of creating or joining an ad-hoc network and may be capable of other types of communication such as cellular telecommunication, WIFI communication, and the like. Wireless device may be configured to establish and video over an ad-hoc network, and/or over a larger network such as the Internet, or an intranet. In one embodiment, wireless device may be any suitable communication device such as a cellular telephone, computer, video-game console, and the like capable of communicating with other wireless devices and networks via antenna. Wireless device may include components such as a transceiver, processor, memory, a game network interface, an input/output interface IO (e.g., keypad), vibration module, and sound module. IO interface may include a display, such as a display on a cellular phone, capable of displaying graphical images as known in the art.

In one embodiment, in order to have the content of the video be selectable by a user, an object detection system is employed. Any suitable method of object detection may be employed. For example, software detection may look at the video code, byte code, packet data, and the like, to detect objects within a video frame. In other embodiments, external optical detectors may be employed to "watch the video" in order to detect objects. Other methods may be used such as pixel analysis, energy density, illumination, tone mapping, edge detection, and the like, used to analyze an image in order to determine objects in the frames of the video.

The object detection system may be hardware, a software program, or combinations thereof. In one configuration, when a video is uploaded, the video is then deconstructed into a series of images that are suitable for object detection. For example, the video stream may be decoded using a codec that decomposes the video into an image hierarchy. Such a hierarchy may be used to detect the boundaries of the objects within each frame of the video. Once the boundaries are known the object detection system may use a lookup table or other means to correlate objects in the scene to separable objects.

In one embodiment, a user may denote objects in the video by using a marker. For example, the user may use a "paint program" and the like to paint and identifying color onto the object. Using the car example, the user may paint the tire with a color such as red and the car a color such as blue in order to identify the car and the tires as separate objects.

Other object detection methodologies may be used. For example, if the frames of the video are converted to a vector based images, the object detection system may be configured to analyze vector data in order to discern and select the objects in the images.

Tagging Objects:

In order to present various objects to a user, the objects are tagged. Objects may be tagged with labels that are then stored in a memory. For example, the labels may be stored as metadata, with information such as which frame or frames the object resides, where in the frame the object is located relative to a frame coordinate system, color of the object, price of the object, material, finish, type, vendors, and the like. The label may also include a pointer to other video images containing the same or similar object. For example, Car A is shown in Video A, Car A is also shown in video B. The pointer may be used to allow the user to see the object in different videos, upon selection thereof. Tagged objects may represent call-to-action opportunities, e.g., a UI element that upon selection allows the user to access more information about the object, or to purchase the object, etc.

Tagging may also include using a video overlay such that the object is projected onto an overlay video image containing coordinate information. The product video and overlay video may be played simultaneously. The overlay video provides the viewing system with data that may be simultaneously shown over the video image. This may be advantageous for source video that cannot be easily analyzed.

Presenting the Source Video:

The source video may be presented in any form, 2D, 3D, or 4D, etc. The presentation may be used to highlight various aspects of the objects or the video scene to the user. The presentation may be done on any suitable output device. In one embodiment, the video is displayed such that objects in the scene selected by a user, are highlighted. In some cases, the highlight may include color changes, object size enhancements, such as a "ballooning" an image, obscuring or deemphasizing other objects that have not been selected.

The source video may also be processed in layers such that objects in the scene that are to be highlighted may be displayed differently than other parts of the video image. For example, consider a video of a stream having fishing lures therein. The lures may be parsed onto a different video layer such that they may be highlighted and selected more easily by a user, shopping, for example, for lures.

Video layers from other video clips may be combined to allow a "mashup" for example, a user may want to sell a boat, but would like to show the boat in a particular location. The video processing system allows for merging such images into a new video. In one embodiment, video processing system combines at least one video data from one video data stream with another video data stream to generate a final image stream. For example, a video stream of the boat may be combined with the video stream of a lake such that the boat appears to be sitting on the lake.

Selecting Objects:

As described here, as the video is being played a user may select to purchase all or part of the objects in the video. In one embodiment, the user may "mouse over" the video and by the position of the cursor above the object, the object may be accentuated. For example, the object being selected may change color as the cursor is moved over the object.

The object may be configured to "float" above the base video. In this example, a car when selected may appear to float above the base video such that the potential buyer or user may discern that the car is the selected object. This may be accomplished using the layered video stream approach as described herein, or by another means. For example, within the same frame as the video, a "hover" layer be employed to display the object. Such a hover layer normally is transparent to the base video. In one embodiment, the base layer contains the object, but once the user "mouses" over the object, the object is projected on the hover layer such that it appears to be floating above the base layer. The projected objected may be configured to turn and rotate in the hover layer. This allows the user to examine the object from many perspectives.

In another embodiment, the processor allows the user to "drag" the object from the video and place it into a "purchase bin" being displayed in the same window as the video. The purchase bin, or cart, may then be used to complete the transaction at any time, for example, during the video play or after the video is played.

The purchase bin may also be used to capture a segment of video for later use. For example, if a cup of coffee was shown in video segment frames 84 though 142, the purchase bin may be used to store the video segment, or allow the user to purchase the object selected within the video segment. This is advantageous as it allows the user to see the object in the video even after being selected for purchase.

Video Deconstruction:

In another embodiment, pieces of the video which may include one or more objects, may be "torn" from the video such that the video frames and/or objects appear to be ripped from the video. Such video decomposition may allow a user to purchase multiple items in one transaction similar to a user who tares a coupon from a advertisement.

Search Bin:

In one embodiment, the media window includes a search bin. The search bin may be configured to accept fragments of the video, or frames of the video, or objects in the video, and then use the data obtained to initiate or perform a query. This may be advantageous as the user may not know what the object or objects are, and can use the search bin to help obtain information such as price, features, color, texture, availability, location, sales, ratings, and may include GPS data used to help physically locate the object or objects. In an example, a viewer is watching a video about a classical guitar and wants to know where it may be found. In one embodiment, the video may contain the location of the guitar, seller info, for example, in a meta data region of the video file, such that when the user "drops" the classical guitar into the search bin, the media player presents a listing of the classical guitar, which may include the listing of the seller, locations, prices, etc. The listing may include a ranking such that the seller is listed at a specified ranking, and other data and images are listed lower or higher in ranking. This is advantageous, as a seller may be the manufacture of the classical guitar, but based on the user's location, the seller may want to direct the user to the closest purchase point to pick up the guitar, after completing the transaction through the media player.

The search bin may also be used to spawn other instances of the media player or videos within the same media player. In this example, several merchants may, for example, have special packages to show, and by invoking multiple videos, a user may select between two or more video offers within the same viewing pane.

Instant Bid:

In one embodiment, the user may tag an object in a video for instant bidding. For example, a user, seller, uploads his guitar video illustrating the guitar being used in a stage show. The user may then tag the guitar as an object to be bid on with other viewers of the video. In one example, the seller sends a message to other users that his guitar is up for bid. When another user views the video and selects the guitar, a bid amount is shown to the other user. The bid amount may then be altered by the other user to a new bid.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the embodiments (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All method or process steps described herein can be performed in any suitable order unless otherwise indicated herein or otherwise clearly contradicted by context. The use of any and all examples, or exemplary language (e.g., "such as") provided herein, is intended merely to better illuminate the various embodiments and does not pose a limitation on the scope of the various embodiments unless otherwise claimed. No language in the specification should be construed as indicating any non-claimed element as essential to the practice of the various embodiments.

Exemplary embodiments are described herein, including the best mode known to the inventors. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, all modifications and equivalents of the subject matter recited in the claims appended hereto are included as permitted by applicable law. Moreover, any combination of the above-described elements in all possible variations thereof is encompassed unless otherwise indicated herein or otherwise clearly contradicted by context.

The invention claimed is:

1. A video processing apparatus, comprising:
a display device;
a processor communicably coupled with the display device, wherein the processor executes instructions to:
receive and process video content comprising a plurality of video frames for display within a first display area of the display device, wherein the video content includes one or more objects embedded therein;
analyze pixel color and energy density variations of the video content over the plurality of frames to identify one or more objects contained therein;
analyze changes in position of the one or more objects over the plurality of frames to determine location and temporal data pertaining to the one or more objects;
determine, using the location and temporal data, the location and temporal location of the one or more objects within the video content for user selection thereof;
receive a call-to-action from a database file, wherein the call-to-action includes a list of objects and related call-to-action transactions for each of the objects listed;
compare the identity of the one or more objects to the list of objects to determine if there is a match therebetween;
play the video content, including the one or more objects contained therein by sequentially displaying the plurality of frames on the first display area;
in response to a match being found between the list of objects and a first object of the one or more identified objects, and in response to a pointing device cursor placed visually occluding a first object of the one or more objects displayed in the first display area, highlight the first object in the first display area using location and temporal data for the first object to maintain the highlight over each frame containing the first object; and
in response to a selection action by the user for the first object, initiate at least one call-to-action transaction related to the first object, wherein the at least one call-to-action transaction is initiated within the first display area while the video content is being played.

2. The apparatus of claim 1, wherein the at least one call-to-action transaction related to the first object is a purchase transaction, wherein the user is enabled to purchase the first object.

3. The apparatus of claim 1, wherein the at least one call-to-action transaction related to the first object is an information access request, wherein the user is enabled to access information about the first object or is provided with information about the first object.

4. The method of claim 1, wherein the user is able to complete the at least one call-to-action transaction from within a media player.

5. A method of displaying video content in conjunction with a purchasing function within a video display, comprising:
receiving and processing video content comprising a plurality of video frames for display within a first display area of a display device, wherein the video content includes one or more objects embedded therein;
analyzing pixel color and energy density variations of the video content over the plurality of frames to identify one or more objects contained therein;
analyzing changes in position of the one or more objects over the plurality of frames to determine location and temporal data pertaining to the one or more objects;

determining using the location and temporal data, the location and temporal location of the one or more objects within the video content for user selection thereof;

receiving a call-to-action from a database file, wherein the call-to-action includes a list of objects and related transactions for each of the objects listed;

comparing the identity of the one or more objects to the list of objects to determine if there is a match therebetween;

playing the video content including the one or more objects contained therein by sequentially displaying the plurality of frames on the first display area;

in response to a match being found between the list of objects and a first object of the one or more identified objects, and in response to a pointing device cursor placed visually occluding a first object of the one or more objects displayed in the first display area, highlighting the first object in the first display area using location and temporal data for the first object to maintain the highlight over each frame containing the first object; and in response to a selection action by the user to procure the first object, initiating at least one call-to-action transaction related to the first object, wherein the at least one call-to-action transaction is initiated within the first display area while the video content is being played.

6. The method of claim 5, wherein the at least one call-to-action transaction related to the first object is a purchase transaction, wherein the user is enabled to purchase the first object.

7. The method of claim 5, wherein the at least one call-to-action transaction related to the first object is an information access request, wherein the user is enabled to access information about the first object.

* * * * *